(12) United States Patent
Wroblewski et al.

(10) Patent No.: US 9,328,493 B2
(45) Date of Patent: May 3, 2016

(54) WASTE LINE SLEEVE FOR LAVATORY CARRIER

(71) Applicant: Zurn Industries, LLC, Erie, PA (US)

(72) Inventors: Douglas R. Wroblewski, Erie, PA (US); William A. Verdecchia, Erie, PA (US)

(73) Assignee: Zurn Industries, LLC, Milwaukee, WI (US)

( * ) Notice: Subject to any disclaimer, the term of this patent is extended or adjusted under 35 U.S.C. 154(b) by 179 days.

(21) Appl. No.: 13/795,990

(22) Filed: Mar. 12, 2013

(65) Prior Publication Data

US 2013/0233995 A1    Sep. 12, 2013

Related U.S. Application Data

(60) Provisional application No. 61/609,455, filed on Mar. 12, 2012.

(51) Int. Cl.
  *E03C 1/244* (2006.01)
  *E03C 1/322* (2006.01)
  *E03C 1/122* (2006.01)
  *F16L 41/12* (2006.01)

(52) U.S. Cl.
  CPC ............... *E03C 1/322* (2013.01); *E03C 1/1222* (2013.01); *F16L 41/12* (2013.01); *Y10T 29/49826* (2015.01)

(58) Field of Classification Search
  CPC ......... E03C 1/021; E03C 1/322; E03C 1/222; F16L 41/12; Y10T 29/49826
  USPC ............. 248/214, 74.4, 544, 49, 542, 220.21, 248/240.1, 247; 4/252.2, 645, 643, 253, 4/353, 661, 901, 646, 647, 648, 649
  See application file for complete search history.

(56) References Cited

U.S. PATENT DOCUMENTS

| | | | | |
|---|---|---|---|---|
| 899,956 A | * | 9/1908 | Coons | 4/648 |
| 1,930,314 A | * | 10/1933 | Healy et al. | 248/74.4 |
| 2,264,082 A | * | 11/1941 | Kintz | 248/125.1 |
| 2,903,712 A | * | 9/1959 | Morris et al. | 4/648 |
| RE25,175 E | | 5/1962 | Nelson et al. | |
| 3,364,503 A | | 1/1968 | Mustee | |
| 3,398,409 A | | 8/1968 | Pope | |
| 3,440,670 A | | 4/1969 | Van Hoof | |
| 3,611,451 A | | 10/1971 | Armstrong | |
| 3,765,036 A | * | 10/1973 | Dykstra | 4/670 |
| 3,810,597 A | | 5/1974 | Flegel et al. | |
| 3,932,899 A | | 1/1976 | Brady et al. | |
| 4,541,602 A | | 9/1985 | Potzas | |
| 5,090,064 A | | 2/1992 | Breitenberger | |
| 5,210,883 A | | 5/1993 | Weber et al. | |
| 5,265,284 A | | 11/1993 | Dottori et al. | |
| 5,697,650 A | * | 12/1997 | Brown | F16L 41/12 285/197 |
| 5,724,773 A | | 3/1998 | Hall | |
| 5,752,679 A | | 5/1998 | Thomason | |
| 6,035,589 A | | 3/2000 | Schmucki et al. | |
| 6,131,957 A | * | 10/2000 | Saito | F16L 21/04 285/133.21 |

(Continued)

*Primary Examiner* — Nkeisha Smith
(74) *Attorney, Agent, or Firm* — Quarles & Brady LLP

(57) ABSTRACT

A vertical carrier for a wall-hung lavatory includes at least two vertically-extending upright members and at least one waste line sleeve connected to the at least one of the at least two vertically-extending upright members. The at least one waste line sleeve includes a horizontal passageway defined therein, the horizontal passageway being configured to allow a horizontal waste line to extend through the at least one waste line sleeve and the at least one of the at least two vertically-extending upright members.

14 Claims, 13 Drawing Sheets

(56) References Cited

U.S. PATENT DOCUMENTS

| | | |
|---|---|---|
| 6,301,838 B1 | 10/2001 | Hall |
| 6,360,381 B1 * | 3/2002 | Fitzgerald, Sr. .................. 4/645 |
| 6,460,204 B1 | 10/2002 | Krist et al. |
| 7,096,520 B2 * | 8/2006 | Nicolia et al. .................... 4/645 |
| 7,191,794 B2 | 3/2007 | Hodges |
| 7,426,937 B2 * | 9/2008 | Doverspike .................. 137/360 |
| 7,458,389 B2 * | 12/2008 | Doverspike .................. 137/360 |
| 7,571,497 B2 * | 8/2009 | Hetzler et al. .................... 4/645 |
| 8,141,177 B1 * | 3/2012 | Majocka et al. ................ 4/252.3 |
| 8,544,121 B1 * | 10/2013 | Majocka et al. ................ 4/252.3 |
| 2005/0251908 A1 | 11/2005 | Doverspike |
| 2006/0102813 A1 | 5/2006 | Hetzler et al. |
| 2009/0126103 A1 | 5/2009 | Dietrich et al. |
| 2013/0205494 A1 * | 8/2013 | Whiteside ........................ 4/695 |
| 2014/0020173 A1 * | 1/2014 | Sargiani ........................... 4/670 |

* cited by examiner

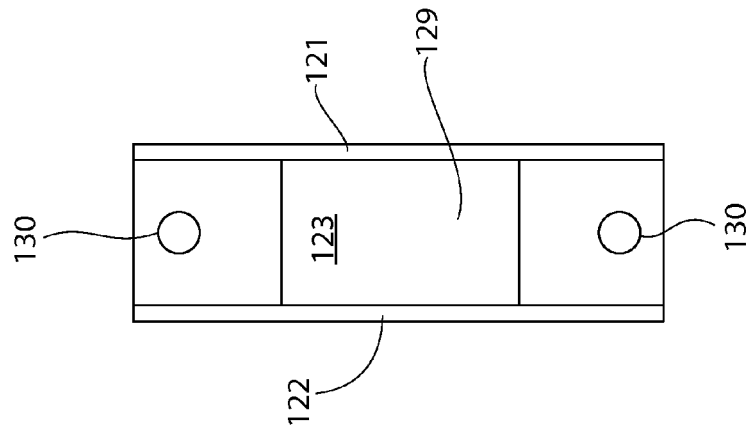
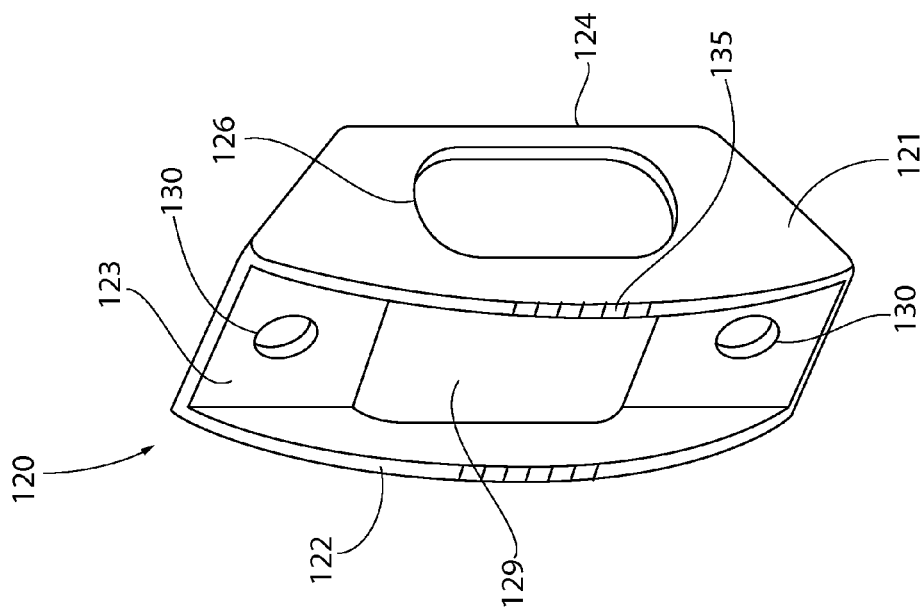
FIG. 3A
FIG. 3B

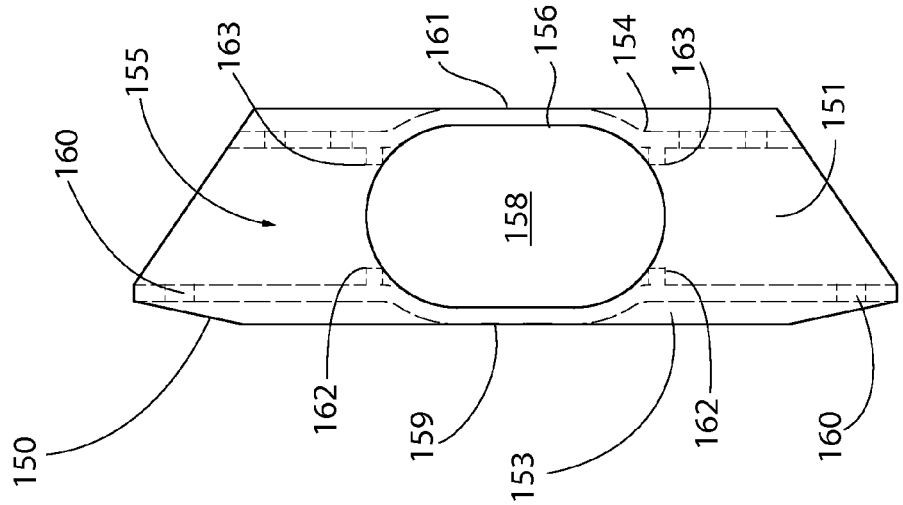
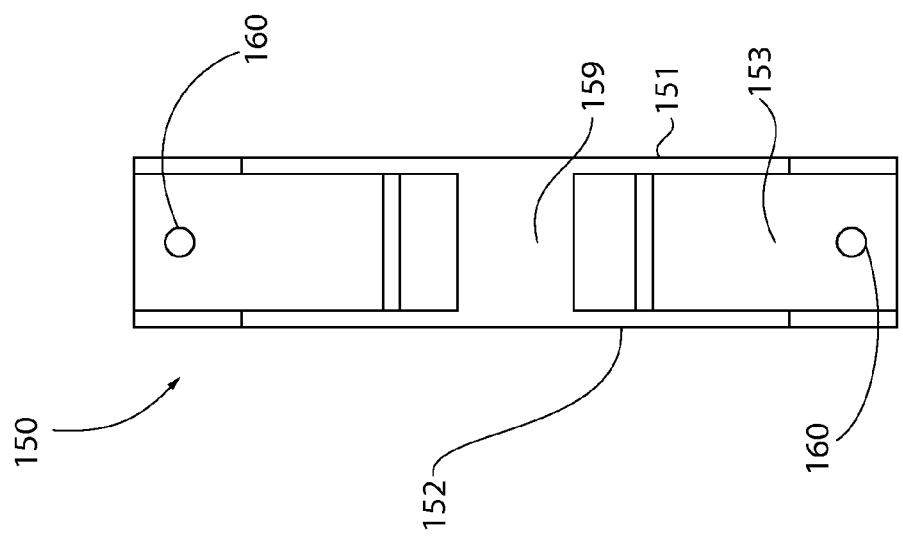
FIG. 4B
FIG. 4A

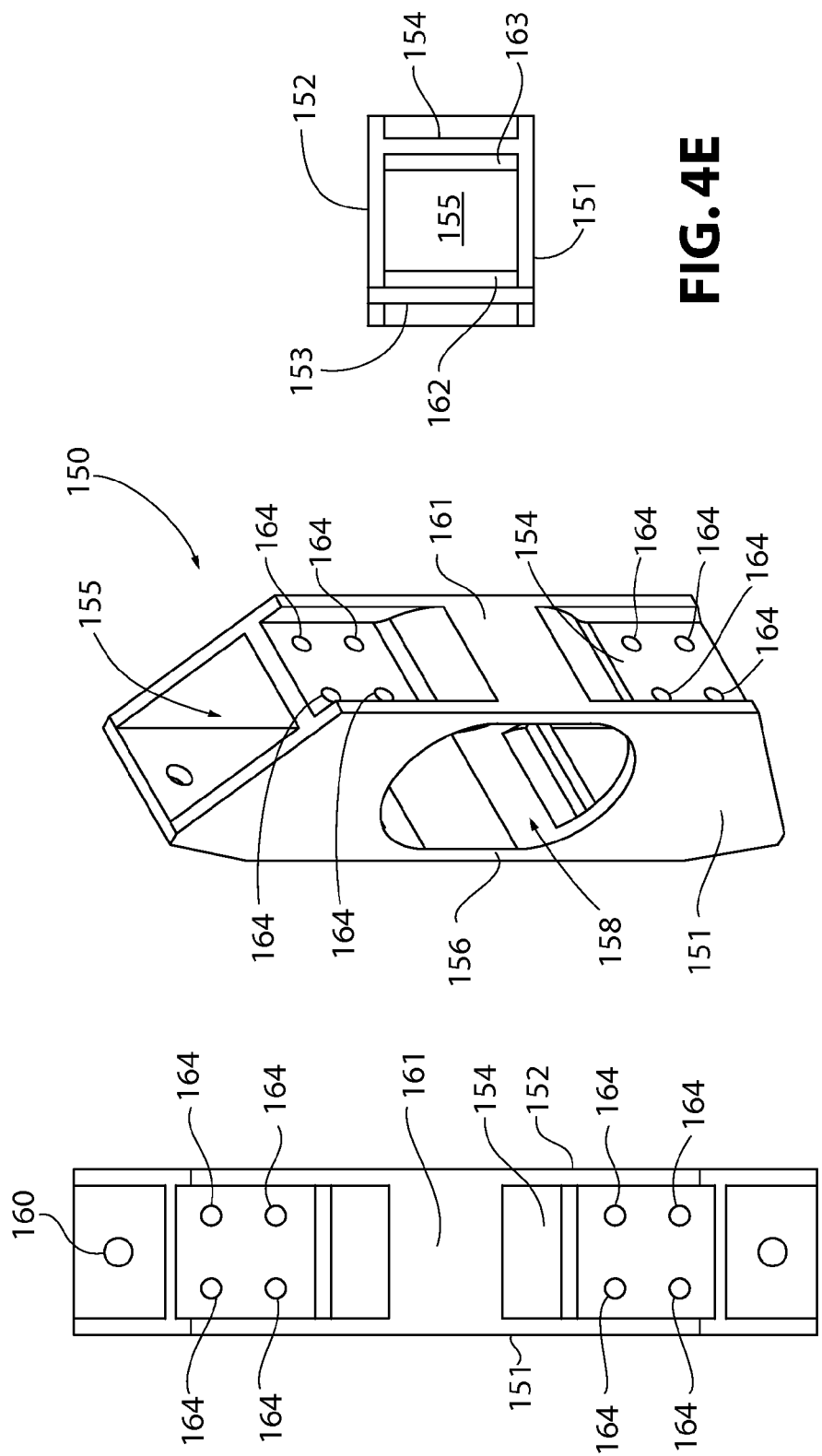

WASTE LINE SLEEVE FOR LAVATORY CARRIER

CROSS REFERENCE TO RELATED APPLICATION

The present application claims priority from U.S. Provisional Patent Application No. 61/609,455, filed on Mar. 12, 2012, which is incorporated herein by reference in its entirety.

BACKGROUND OF THE INVENTION

1. Field of the Invention

The present invention relates to fixture carriers for supporting plumbing fixtures and, more particularly, to a carrier having a frame with a vertical upright that includes a waste line sleeve, which defines a horizontally-extending passageway through the vertical upright to allow for passage of a horizontal waste line through the upright.

2. Description of Related Art

Building design and construction is increasingly utilizing plumbing chase space, i.e., the space behind and in between walls that contains plumbing supply and waste lines, of the narrowest possible width. Steel wall studs can normally be 2"×4" resulting in an actual 1½"×3½" physical dimension. The need for lavatory carriers to fit into the actual 3½" wide space is increasing.

Several models of prior art lavatory carriers are able to fit into the 3½" wide space. Such carriers typically use some sort of upright tube or pipe as part of the support system. Those upright tubes or pipes, for the most part, will fill the 3½" width of the chase space. In many instances, particularly when multiple lavatories are in a restroom, it is desirable to have a common horizontal waste line (with pitch) that each lavatory will connect to for waste discharge.

An example of such a carrier is disclosed in U.S. Pat. No. 7,096,520 (hereinafter "the '520 patent"), issued on Aug. 29, 2006, which is hereby incorporated by reference in its entirety. FIG. 1 illustrates a fixture carrier 10 in accordance with the '520 patent. The carrier 10 includes a pair of vertical uprights 20 and may or may not include a top cross bar 30 and bottom cross bar 40, which connect the vertical uprights 20. A support arm 60 for supporting a lavatory 70 is fixed to the vertical uprights 20 by brackets 50 and associated hardware. A waste trap line 80 connects a waste discharge of the lavatory 70 to a common horizontal waste line 90. The fixture carrier 10 is installed in a chase space 100 having a width of 3½".

As illustrated in FIG. 1, the problem is that the carrier uprights 20 are blocking the width of the chase space 100 and the horizontal waste line 90 cannot pass "through" the uprights 20. Simply cutting a hole in or through the upright may compromise the structural integrity of the upright and cause the carrier system to not pass the industry standard load testing performance requirements and/or be unacceptable in actual use.

SUMMARY OF THE INVENTION

There is a general need in the art, therefore, for a waste line sleeve for incorporation into the vertical uprights of a lavatory carrier that allows for a horizontal waste line to pass through the upright in a narrow chase space, while maintaining the structural integrity of the vertical upright.

According to one embodiment, the present invention provides a vertical carrier for a wall-hung lavatory. The vertical carrier includes a carrier frame having at least two operatively connected vertically-extending upright members, and at least one waste line sleeve inserted onto at least one of the vertically-extending upright members. The at least one waste line sleeve includes a horizontal passageway defined therein, the horizontal passageway being configured to allow a horizontal waste line to extend through the at least one waste line sleeve and the at least one of the vertically-extending upright members.

According to a particular embodiment of the present invention, a vertical carrier for a wall-hung lavatory is provided. The vertical carrier includes at least two vertically-extending upright members and at least one waste line sleeve connected to at least one of the at least two vertically-extending upright members. The at least one waste line sleeve includes a horizontal passageway defined therein, the horizontal passageway being configured to allow a horizontal waste line to extend through the at least one waste line sleeve and the at least one of the at least two vertically-extending upright members.

According to another particular embodiment of the present invention, a method of extending a horizontal waste line through a vertical carrier for a wall-hung lavatory is provided. The method includes the steps of providing at least two vertically-extending upright members; providing at least one waste line sleeve connected to at least one of the at least two vertically-extending upright members, the at least one waste line sleeve including a horizontal passageway defined therein that extends through the at least one of the at least two vertically-extending upright members; and passing the horizontal waste line through the at least one waste line sleeve and the at least one of the at least two vertically-extending upright members.

According to yet another embodiment of the present invention, a method of extending a horizontal waste line through a vertical carrier for a wall-hung lavatory is provided. The method includes the steps of determining a desired placement height of the horizontal waste line within a chase space to be occupied by the vertical carrier; receiving an order for at least one vertically-extending upright member of the vertical carrier, the at least one vertically-extending upright member having a waste line sleeve integrally formed therein, the waste line sleeve including a horizontal passageway defined therein that extends through the at least one vertically-extending upright member at the desired placement height; manufacturing the at least one vertically-extending upright member according to the order received in the receiving step; delivering the at least one vertically-extending upright member to its needed location; installing the at least one vertically-extending upright member in the chase space; and passing the horizontal waste line through the horizontal passageway of the waste line sleeve of the at least one vertically-extending upright member.

Further details and advantages of the invention will become clear upon reading the following detailed description in conjunction with the accompanying drawing figures, wherein like parts are designated with like reference numerals throughout.

BRIEF DESCRIPTION OF THE DRAWINGS

FIG. 3A depicts a perspective view of the waste line sleeve of FIG. 2;

FIG. 3B depicts a front view of the waste line sleeve of FIG. 2;

FIG. 4A depicts a front view of a waste line sleeve according to another embodiment of the present invention;

FIG. 4B depicts a right side view of the waste line sleeve of FIG. 4A;

FIG. 4C depicts a rear view of the waste line sleeve of FIG. 4A;

FIG. 4D depicts a perspective view of the waste line sleeve of FIG. 4A;

FIG. 4E depicts a top view of the waste line sleeve of FIG. 4A;

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
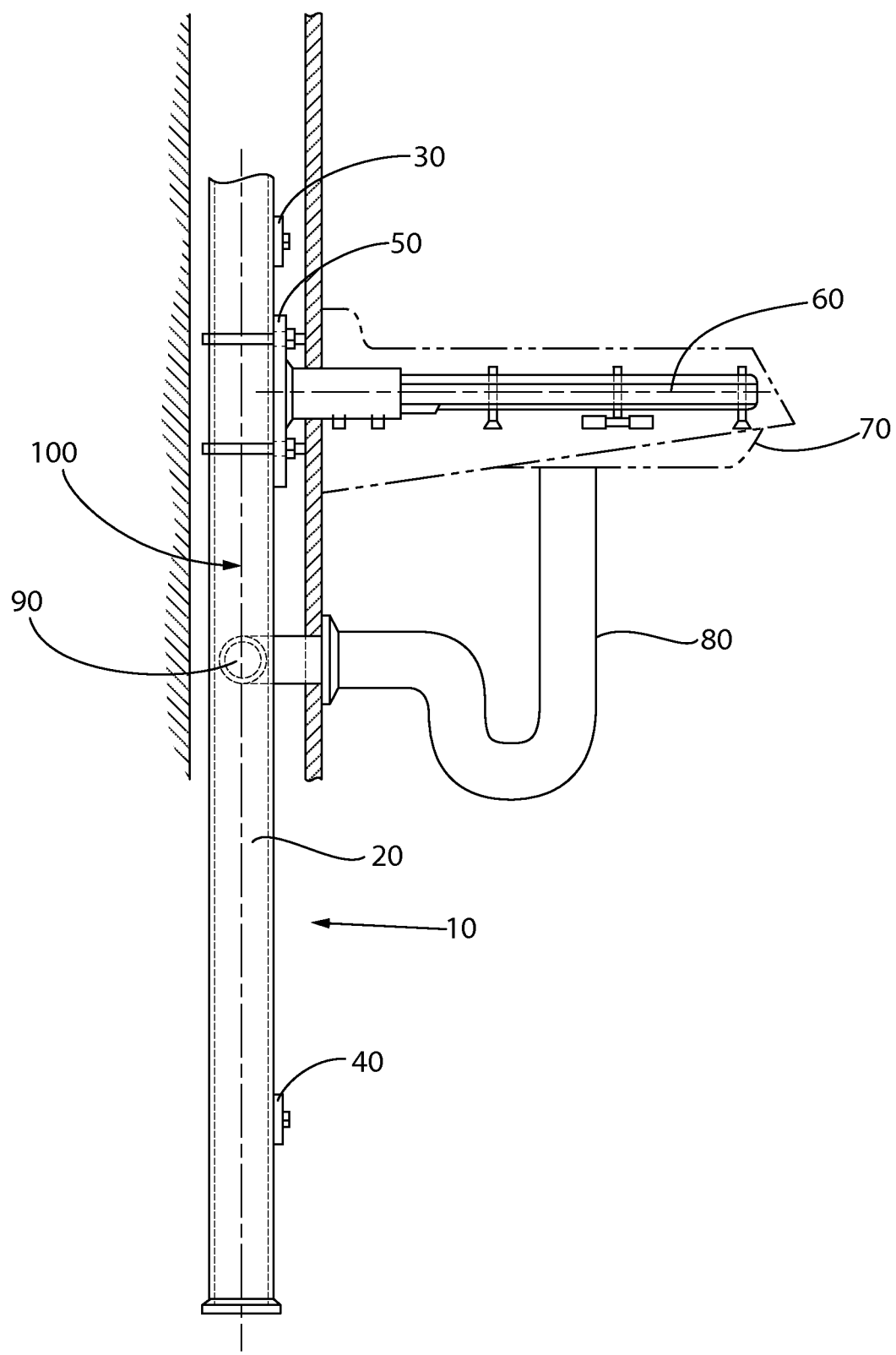
FIG. 1 depicts a left side view of a lavatory carrier according to the prior art installed in a narrow chase space.
Figure 9:
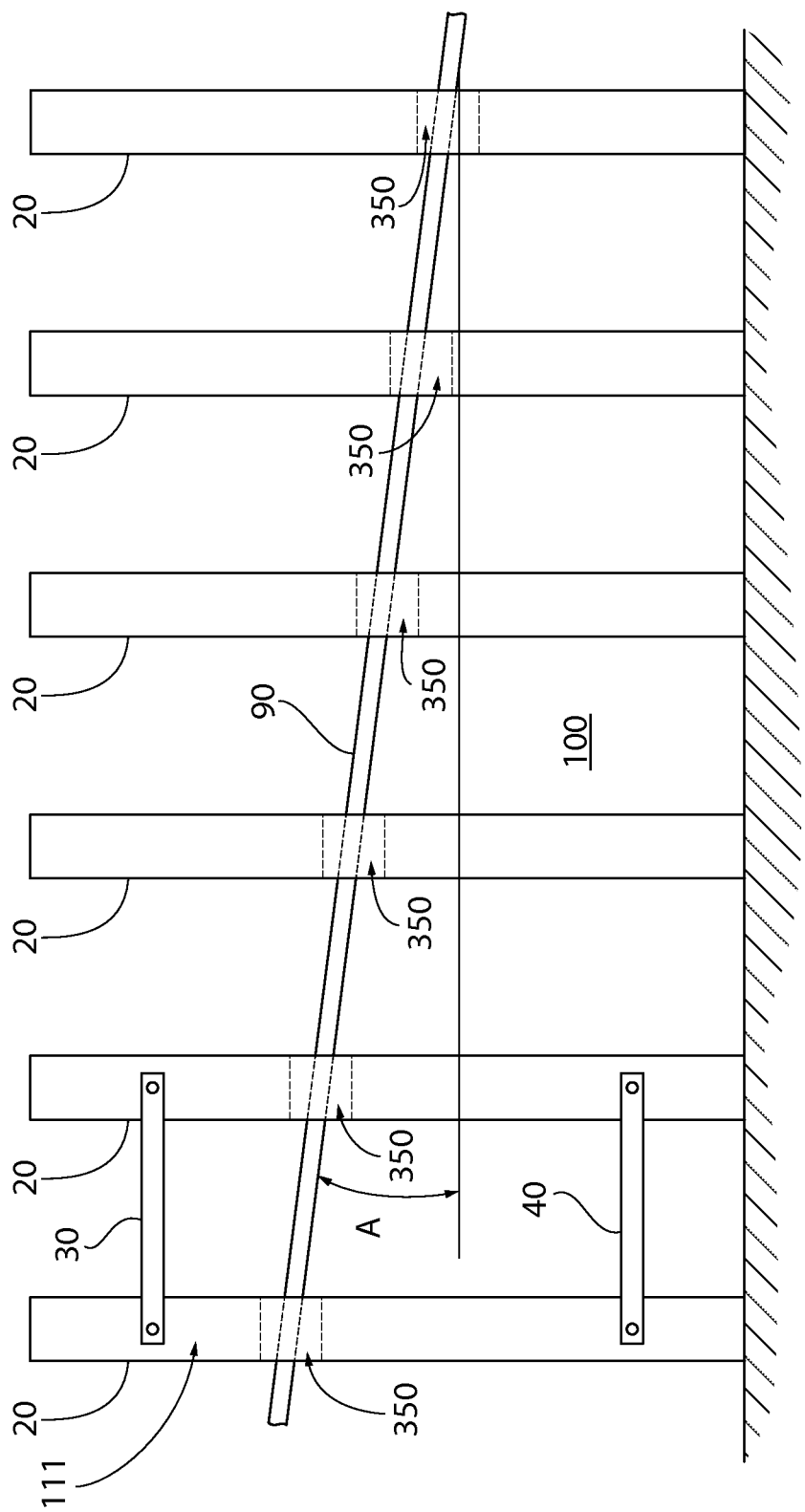
FIG. 9 depicts a schematic of a bank of lavatory carriers according to an embodiment of the present invention.

With reference to FIGS. 2 and 3A-3D, a lavatory carrier 110 incorporating a waste line sleeve 120 is shown in accordance with an embodiment of the present invention. The lavatory carrier 110 fits within a 3½" wide chase space 100 and includes at least two vertically-extending upright members 20, attachment brackets 50, and support arms 60 for supporting a lavatory 70, as discussed above with respect to FIG. 1 and the '520 patent. The at least two vertically-extending upright members 20 may or may not be operatively connected. In particular, the lavatory carrier 110 may or may not also include a top cross bar 30 and a bottom cross bar 40 for connecting the uprights 20, as discussed in the '520 patent and as shown in FIG. 9. Accordingly, the at least two vertically-extending upright members 20, the top cross bar 30, and the bottom cross bar 40 define a carrier frame 111, as shown in FIG. 9. It is to be appreciated that the lavatory carrier 110 may incorporate some other structure for operatively connecting the uprights 20 as an alternative to the cross bars 30, 40. The waste discharge of the lavatory 70 is connected to the horizontal waste line 90 by the waste trap line 80. The horizontal waste line 90 may be pitched in a manner known to be suitable to those having ordinary skill in the art, as is also shown in FIG. 9.

Figure 2:
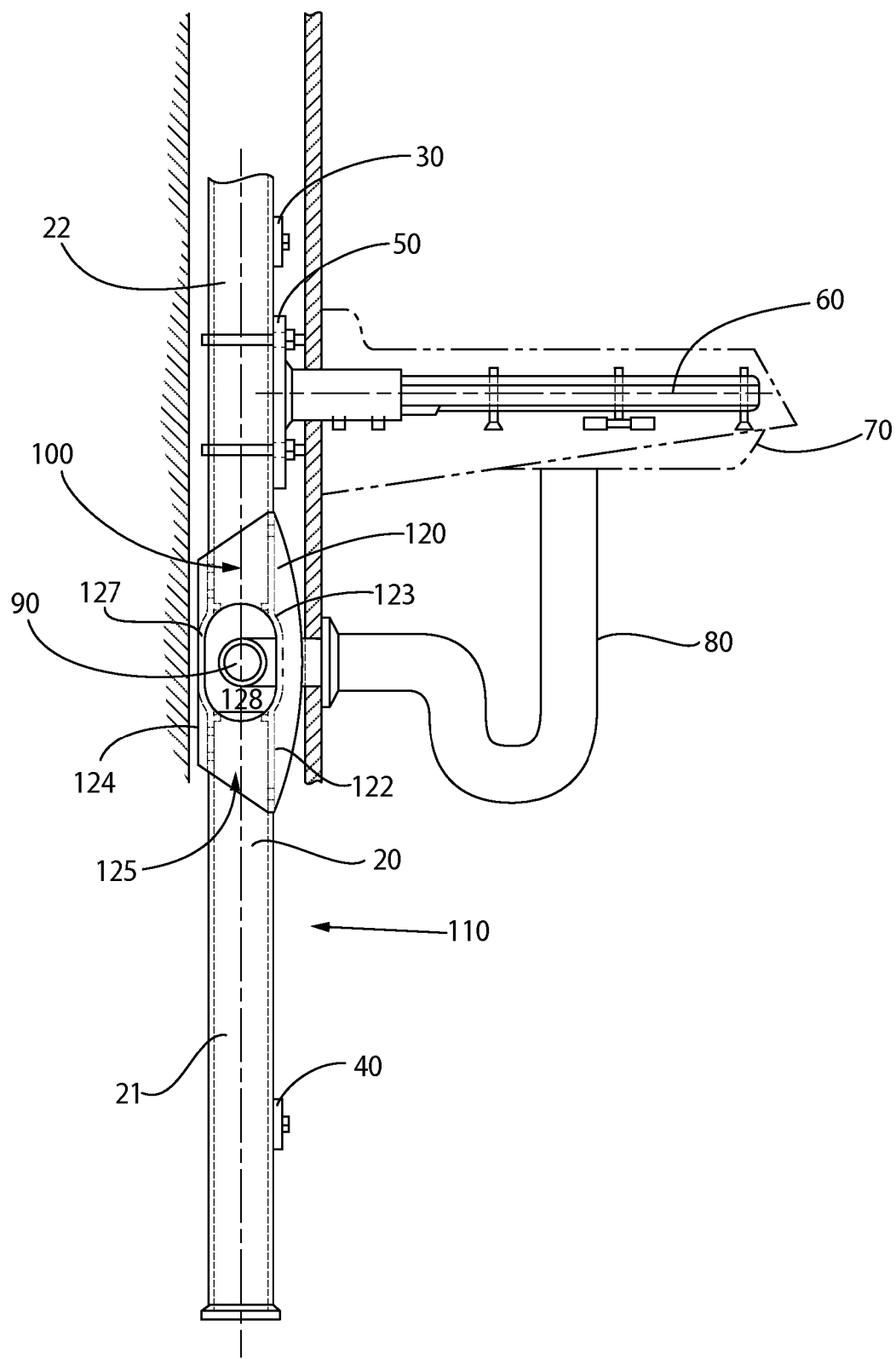
FIG. 2 depicts a left side view of a lavatory carrier incorporating a waste line sleeve according to an embodiment of the present invention.
Figure 3D:
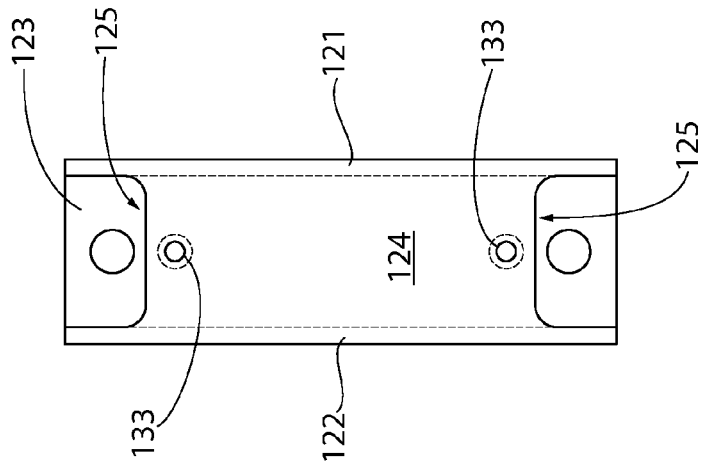
FIG. 3D depicts a rear view of the waste line sleeve of FIG. 2.
Figure 3C:
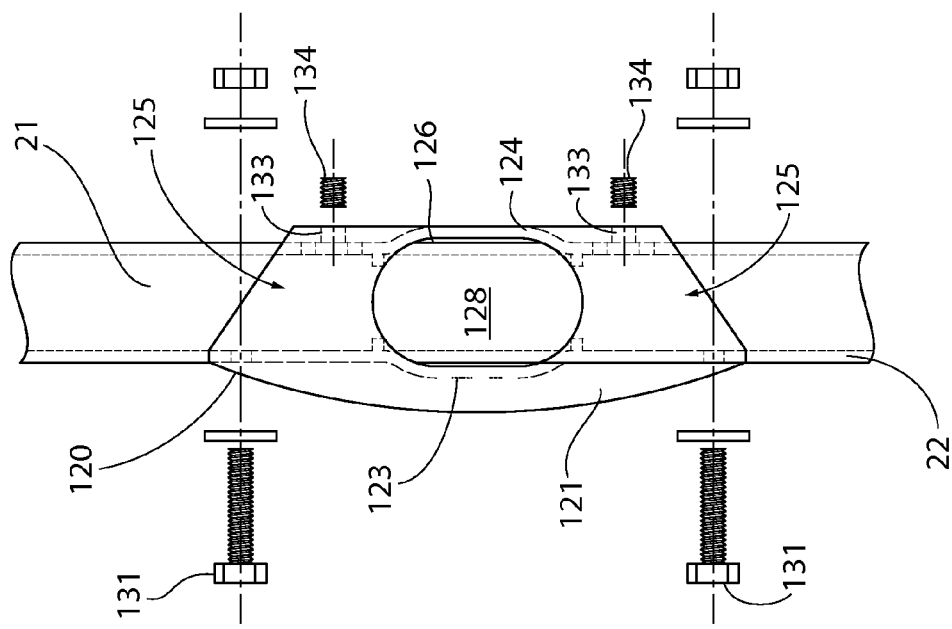
FIG. 3C depicts a right side view of the waste line sleeve of FIG. 2.

As shown in FIGS. 3A-3D, the waste line sleeve 120 includes a body made from cast iron, steel, or other suitable material known to those having ordinary skill in the art. The body of the waste line sleeve 120 includes a right side 121, a left side 122, a front side 123, and a rear side 124. The sides 121, 122, 123, 124 define a hollow interior in the body of the waste line sleeve 120 to form a vertical passageway 125 extending through the waste line sleeve 120. As shown in FIGS. 2 and 3C, at least one of the at least two vertically-extending upright members 20 is cut into a bottom piece 21 and a top piece 22, with the waste line sleeve 120 inserted between the pieces 21, 22. The vertical passageway 125 is typically formed to have a square or rectangular shape to conform to the shape of the vertically-extending upright member 20, such that the bottom piece 21 and the top piece 22 of the vertically-extending upright member 20 may be inserted into the vertical passageway 125 from the bottom and top of the waste line sleeve 120, respectively, to connect the waste line sleeve 120 to the at least one of the at least two vertically-extending upright members 20 between the bottom piece 21 and the top piece 22. The vertical passageway 125 may alternatively have a round shape or any other shape conforming to the shape of a particular vertically-extending upright member 20. In particular, the vertical passageway 125 is sized to closely fit the outside dimensions of the vertically-extending upright member 20.

The right side 121 of the waste line sleeve 120 has an elongated opening 126 defined therein and the left side 122 of the waste line sleeve 120 has another elongated opening 127 defined therein. The elongated openings 126, 127 communicate the hollow interior of the waste line sleeve 120 with the exterior of the right side 121 and the left side 122 of the waste line sleeve 120 to define a horizontal passageway 128 extending through the waste line sleeve 120. As shown in FIG. 2, the horizontal passageway 128 allows the horizontal waste line 90 to pass through the waste line sleeve 120 and the at least one of the at least two vertically-extending upright members 20. The front side 123 of the waste line sleeve 120 may include a protruding central portion 129 to correspond to the shape of the elongated openings 126, 127 and accommodate the shape of the horizontal waste line 90 extending through the horizontal passageway 128. Further, the right side 121 and the left side 122 may extend beyond the front side 123 to define flanges, which increase the structural strength of the waste line sleeve 120. As such, the waste line sleeve 120 serves to define the horizontal passageway 128, allowing the horizontal waste line 90 to pass through the vertically-extending upright member 20, but also structurally reinforces the vertically-extending upright member 20 at the location where the vertically-extending upright member 20 is cut.

The waste line sleeve 120 is connected to the vertically-extending upright member 20 by thru bolts 131 and associated hardware or similar fasteners. The thru bolts 131 extend through clearance holes 130 defined in the front side 123 of the waste line sleeve 120, near the top and bottom ends thereof, and through corresponding holes drilled through the vertically-extending upright member 20 to secure the waste line sleeve 120. Further, drilled and tapped holes 133 are provided in the rear side 124 of the waste line sleeve 120. The drilled and tapped holes 133 receive set screws 134, which clamp the waste line sleeve 120 to the vertically-extending upright member 20. Alternatively, the waste line sleeve 120 may be connected to the vertically-extending upright member 20 by some other method known to be suitable to those having ordinary skill in the art. For instance, the waste line sleeve 120 could be welded between the bottom piece 21 and the top piece 22 of the vertically-extending upright member 20.

With further reference to FIGS. 2 and 3A-3D, the lavatory carrier 110 is assembled with the waste line sleeve 120 by the contractor on site. Initially, the contractor determines the height of where the horizontal waste line 90 will pass through the vertically-extending upright member 20. The contractor then cuts the vertical upright 20 into the bottom piece 21 and the top piece 22 at that location. To that end, in order to account for the pitch in the horizontal waste line 90, the front side 123 or the edges of the right side 121 and the left side 122 of the waste line sleeve 120 may include pitch setting alignment markings 135 to assist the contractor in setting the heights of the waste line sleeves 120 in a series of vertically-extending upright members 20 of consecutively arranged lavatory carriers 110, as shown in FIG. 9. After cutting the vertical upright 20, the contractor then inserts the bottom and top pieces 21, 22 of the vertically-extending upright member 20 into the vertical passageway 125 at the top and bottom of the waste line sleeve 120, leaving the horizontal passageway 128 unobstructed. The bottom and top pieces 21, 22 of the vertically-extending upright member 20 are clamped in place by the set screws 134 threadably engaging the drilled and tapped holes 133 in the rear side 124 of the waste line sleeve 120. The clearance holes 130 in the front side 123 of the waste line sleeve 120 are then used as templates to drill thru holes in the pieces of the vertically-extending upright member 20. The thru bolt 131 and associated hardware is then fastened to the waste line sleeve 120 and the vertically-extending upright member 20 via the clearance holes 130 and the thru holes in the vertically-extending upright member 20 to rigidly connect the waste line sleeve 120 between the cut pieces 21, 22 of the vertically-extending upright member 20. The lavatory carrier 110 may then be assembled and installed in the chase space 100 as normal, with the horizontal waste line 90 passing through the vertically-extending upright member 20. It is to be appreciated that while the lavatory carrier 110 is described above with at least one waste line sleeve 120 being connected to at least one vertically-extending upright member 20 of the at least two vertically-extending upright members 20 of the lavatory carrier 110, the lavatory carrier 110 could be provided with a waste line sleeve 120 in each of the vertically-extending upright members 20 such that the horizontal waste line 90 can pass entirely through the lavatory carrier 110, or multiple waste line sleeves 120 may be provided in only one or multiple vertically-extending upright members 20 to accommodate a plurality of waste lines 90 or the like extending through the lavatory carrier 110.

With reference to FIGS. 4A-4E, a waste line sleeve 150 in accordance with another embodiment of the present invention is shown. The waste line sleeve 150 can also be used in the context of the lavatory carrier 110 described above with reference to FIG. 2 and may be installed in a manner similar to that described above with reference to FIGS. 2 and 3A-3D. In particular, the waste line sleeve 150 is configured to be connected by thru bolts 131 and set screws 134 or by some other method, such as welding, between a bottom piece 21 and a top piece 22 of the vertically-extending upright member 20, as discussed above with reference to the waste line sleeve 120 shown in FIGS. 2 and 3A-3D.

The waste line sleeve 150 includes a body made from cast iron, steel, or other suitable material known to those having ordinary skill in the art. The body of the waste line sleeve 150 includes a right side 151, a left side 152, a front side 153, and a rear side 154. The sides 151, 152, 153, 154 define a hollow interior in the body of the waste line sleeve 150 to form a vertical passageway 155 extending through the waste line sleeve 150. The vertical passageway 155 is typically formed to have a square or rectangular shape to conform to the shape of the vertically-extending upright member 20, such that the bottom piece 21 and the top piece 22 of the vertically-extending upright member 20 may be inserted into the vertical passageway 155 from the bottom and top of the waste line sleeve 150, respectively, to connect the waste line sleeve 150 to the at least one of the at least two vertically-extending upright members 20 between the bottom piece 21 and the top piece 22. To that end, the waste line sleeve 150 may further include interior abutments 162, 163 extending from the front side 153 and the rear side 154, respectively, into the vertical passageway 155 above and below a horizontal passageway 158, as shown in FIGS. 4B and 4E. The interior abutments 162, 163 are configured to engage the top piece 22 and the bottom piece 21 of the vertically-extending upright member 20 inserted into the vertical passageway 155 to prevent movement of the waste line sleeve 150 with respect to the top and bottom pieces 22, 21 of the vertically-extending upright member 20.

The right side 151 and the left side 152 of the waste line sleeve 150 each has an elongated opening 156 defined therein. The elongated openings 156 communicate the hollow interior of the waste line sleeve 150 with the exterior of the right side 151 and the left side 152 of the waste line sleeve 150 to define the horizontal passageway 158 extending through the waste line sleeve 150. The horizontal passageway 158 allows the horizontal waste line 90 to pass through the waste line sleeve 150 and the at least one of the at least two vertically-extending upright members 20. The front side 153 of the waste line sleeve 150 may include a protruding central portion 159, and the rear side 154 of the waste line sleeve 150 may also include a protruding central portion 161. The protruding central portions 159, 161 correspond to the shape of the elongated openings 126, 127 and accommodate the shape of the horizontal waste line 90 extending through the horizontal passageway 128. Further, the right side 151 and the left side 152 may extend beyond the front side 153 and the rear side 154 to define flanges, which increase the structural strength of the waste line sleeve 150. As such, the waste line sleeve 150 serves to define the horizontal passageway 158, allowing the horizontal waste line 90 to pass through the vertically-extending upright member 20, but also structurally reinforces the vertically-extending upright member 20 at the location where the vertically-extending upright member 20 is cut. The waste line sleeve 150 also includes clearance holes 160 defined in the front side 153, near the top and bottom ends of the waste line sleeve 150, to receive the thru bolts 131 connecting the waste line sleeve 150 to the vertically-extending upright member 20. Further, drilled and tapped holes 164 are provided in the rear side 154 of the waste line sleeve 150 to receive the set screws 134, which clamp the waste line sleeve 150 to the vertically-extending upright member 20.

With reference to FIGS. 5 and 6A-6C, a lavatory carrier 210 incorporating a waste line sleeve 220 is shown in accordance with another embodiment of the present invention. The lavatory carrier 210 fits within a 3½" wide chase space 100 and includes at least two vertically-extending upright members 20, attachment brackets 50, and support arms 60 for supporting a lavatory 70, as discussed above with respect to FIG. 1 and the '520 patent. The lavatory carrier 210 may or may not also include a top cross bar 30 and a bottom cross bar 40 for connecting the uprights 20, as discussed in the '520 patent and as shown in FIG. 9. As discussed above with reference to the lavatory carrier 110 shown in FIG. 2, the lavatory carrier 210 may incorporate some structure for operatively connecting the vertically-extending upright members 20, such as the cross bars 30, 40, which together with the vertically-extending upright members 20 may form a carrier frame 111. The waste discharge of the lavatory 70 is connected to the horizontal waste line 90 by the waste trap line 80. The horizontal waste line 90 may be pitched, as would be appreciated by one having ordinary skill in the art.

Figure 5:
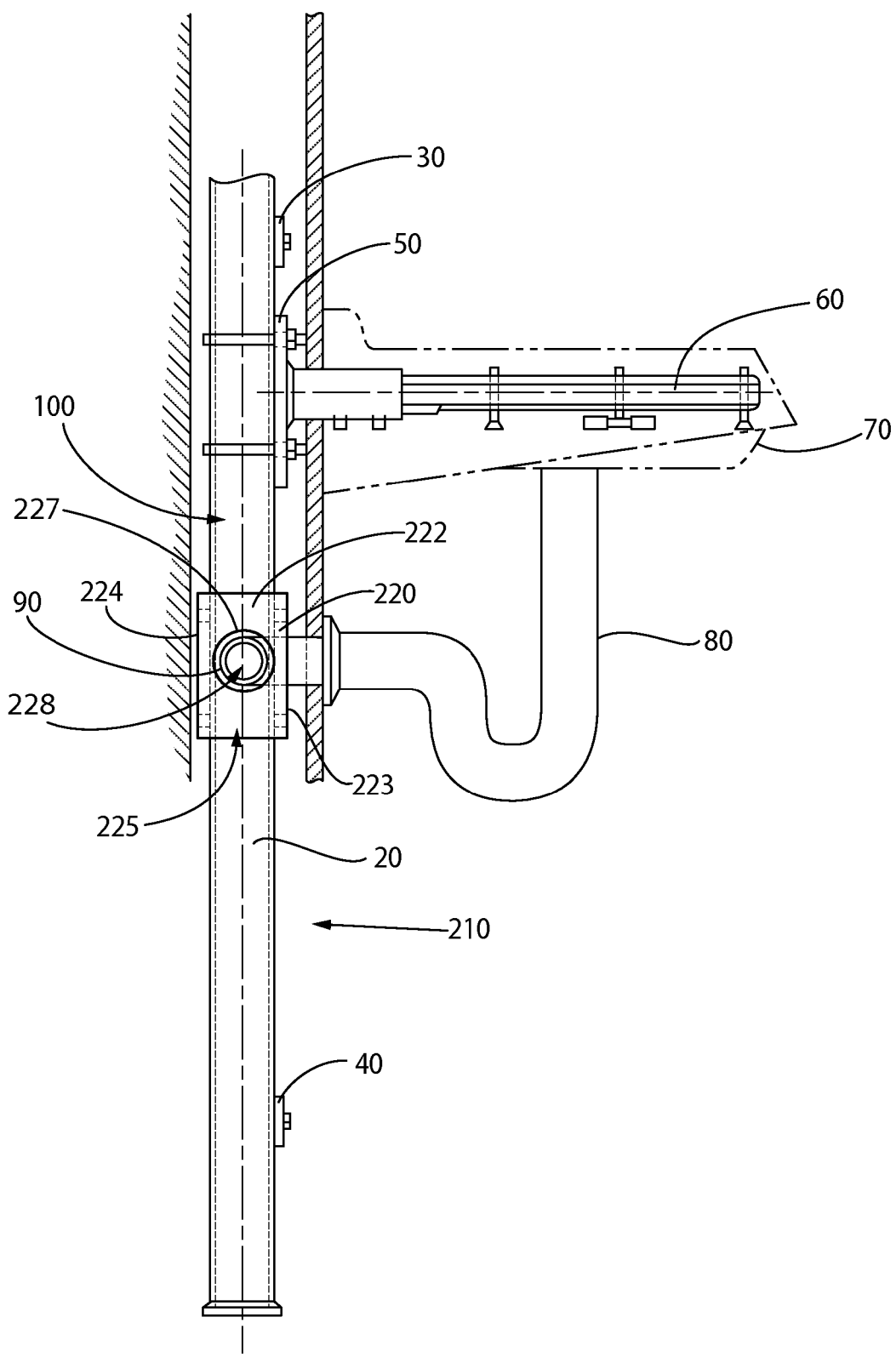
FIG. 5 depicts a left side view of a lavatory carrier incorporating a waste line sleeve according to another embodiment of the present invention.
Figure 6B:
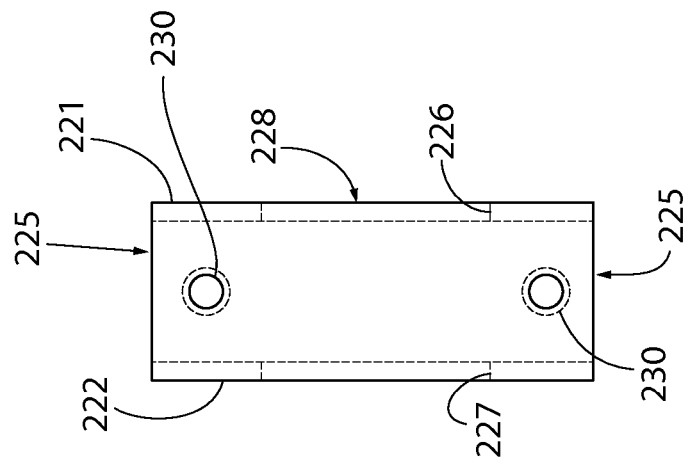
FIG. 6B depicts a front view of the waste line sleeve of FIG. 5.
Figure 6A:
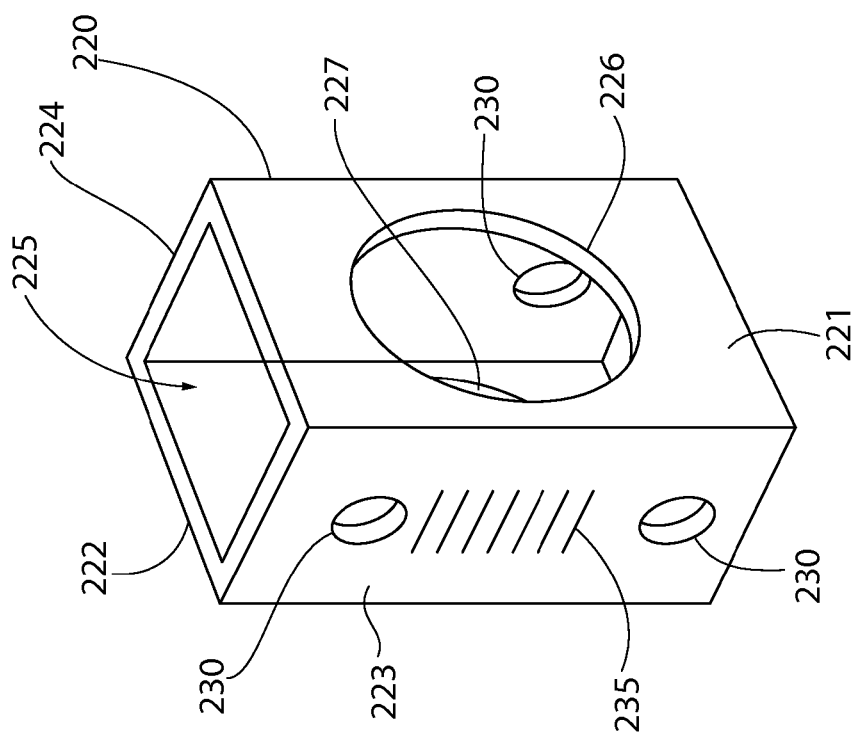
FIG. 6A depicts a perspective view of the waste line sleeve of FIG. 5.
Figure 6C:
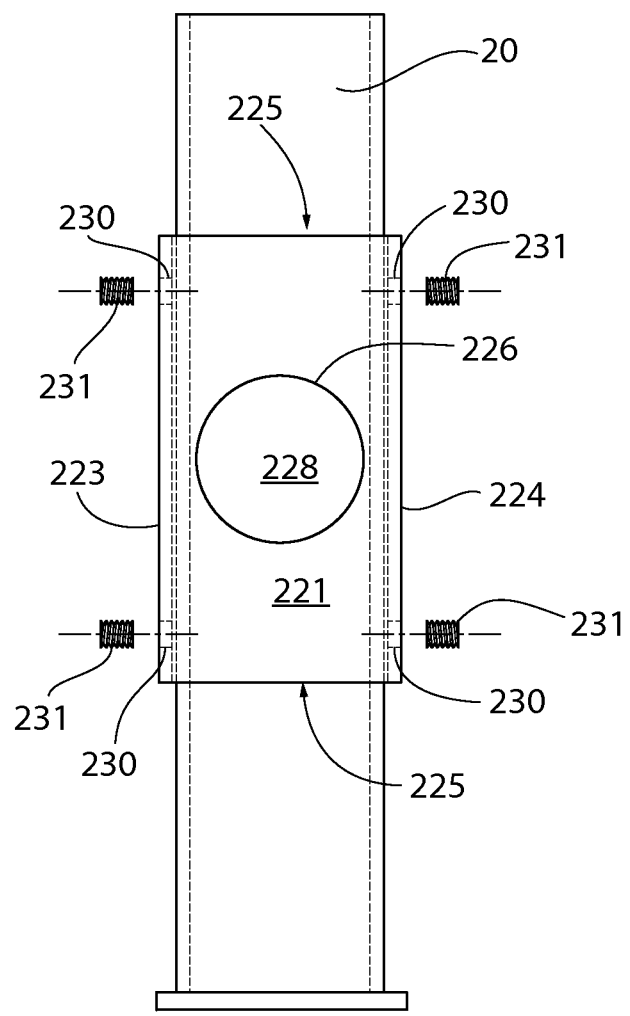
FIG. 6C depicts a right side view of the waste line sleeve of FIG. 5.

The waste line sleeve 220 includes a body made from cast iron, steel, or other suitable material known to those having ordinary skill in the art. The body of the waste line sleeve 220 includes a right side 221, a left side 222, a front side 223, and a rear side 224. The sides 221, 222, 223, 224 define a hollow interior in the body of the waste line sleeve 220 to form a vertical passageway 225 extending through the waste line sleeve 220. The vertical passageway 225 is typically formed to have a square or rectangular shape to correspond to the shape of the vertically-extending upright member 20. In particular, as shown in FIGS. 5 and 6C, the waste line sleeve 220 surrounds the vertically-extending upright member 20 such that vertically-extending upright member 20 extends through the vertical passageway 225. The vertical passageway 225 may alternatively have a round shape or any other shape corresponding to the shape of a particular vertically-extending upright member 20. In particular, the vertical passageway 225 is sized to closely fit the outside dimensions of the vertically-extending upright member 20.

The right side 221 of the waste line sleeve 220 has a circular opening 226 defined therein and the left side 222 of the waste line sleeve 220 has another circular opening 227 defined therein. The circular openings 226, 227 communicate the hollow interior of the waste line sleeve 220 with the exterior of the right side 221 and the left side 222 of the waste line sleeve 220 to define a horizontal passageway 228 extending through the waste line sleeve 220, which is sized to accept the horizontal waste line 90. The circular openings 226, 227 also act as guide holes for the contractor to drill corresponding holes in the respective sidewalls of the vertically-extending upright member 20 to allow the horizontal waste line 90 to pass through the vertically-extending upright member 20, without the necessity of cutting the vertically-extending upright member 20 into two separate pieces. The waste line sleeve 220 is connected to the vertical upright 20 by a plurality of set screws 231, which threadably engage drilled and tapped holes 230 formed in the front side 223 and the rear side 224 of the waste line sleeve 220 to clamp the waste line sleeve 220 to the vertical upright 20. As such, the waste line sleeve 220 serves to define the horizontal passageway 228, allowing the horizontal waste line 90 to pass through the vertical upright 20, but also structurally reinforces the vertically-extending upright member 20 at the location where the vertically-extending upright member 20 is cut.

With further reference to FIGS. 5-6C, the lavatory carrier 210 is assembled with the waste line sleeve 220 by the contractor on site. Initially, the waste line sleeve 220 is slid over the vertically-extending upright member 20 and the contractor determines the height of where the horizontal waste line 90 will pass through the vertically-extending upright member 20. To that end, in order to account for the pitch in the horizontal waste line 90, the front side 223 of the waste line sleeve 220 may include pitch setting alignment markings 235 to assist the contractor in setting the heights of the waste line sleeves 220 in a series of vertically-extending upright members 20 of consecutively arranged lavatory carriers 210. After the height of where the horizontal waste line 90 will pass through the vertically-extending upright members 20 is determined, the waste line sleeve 220 is secured in place along the vertically-extending upright members 20 by the set screws 231. The contractor can then use a hole saw or similar tool to drill a hole in each side of the vertically-extending upright members 20 using the circular openings 226, 227 in the right side 221 and the left side 222 of the waste line sleeve 220, respectively, as guides. The lavatory carrier 210 may then be assembled and installed in the chase space 100 as normal, with the horizontal waste line 90 passing through the vertically-extending upright members 20.

Figure 7:
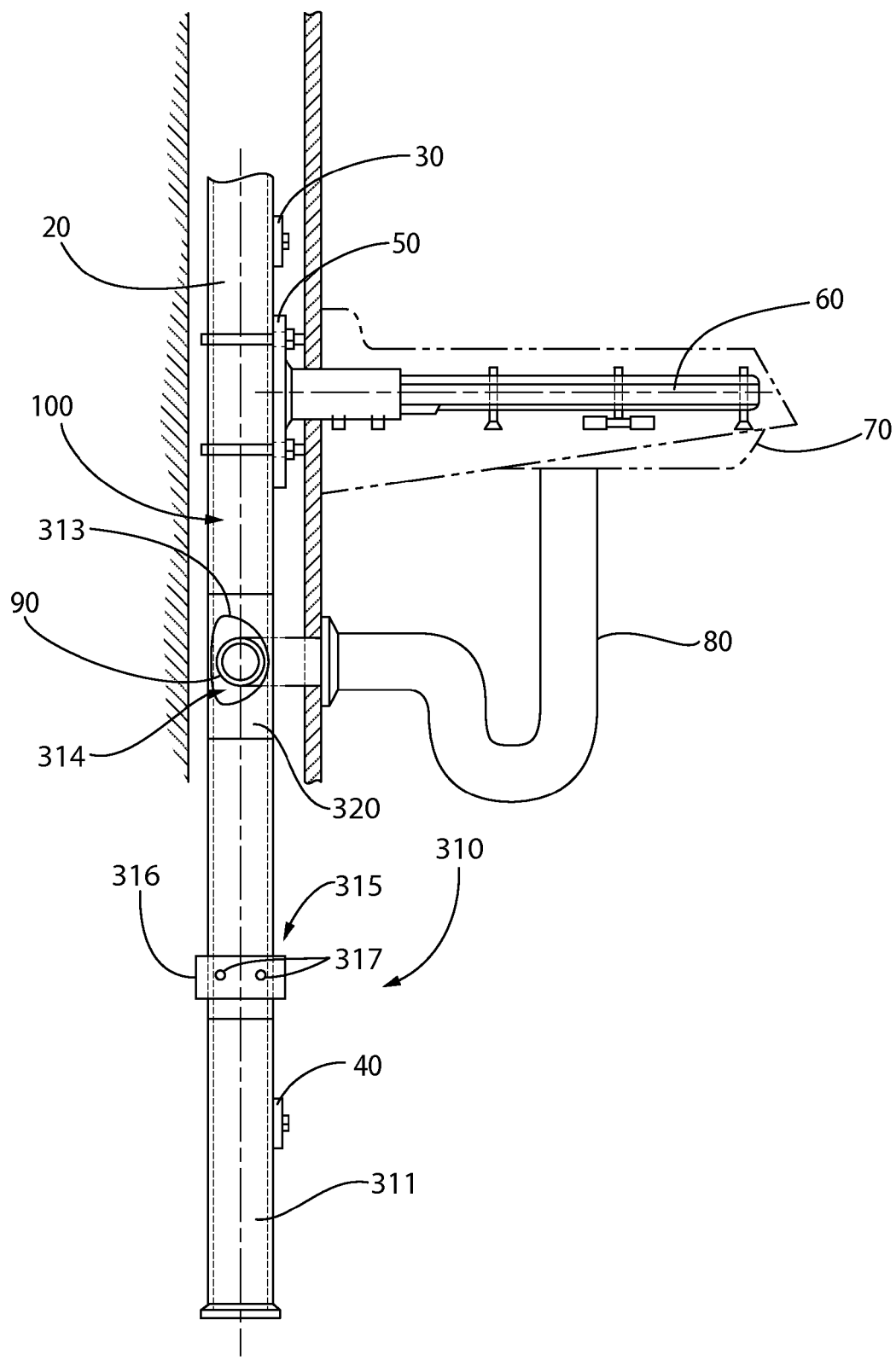
FIG. 7 depicts a left side view of a lavatory carrier incorporating a waste line sleeve according to another embodiment of the present invention.
Figure 8:
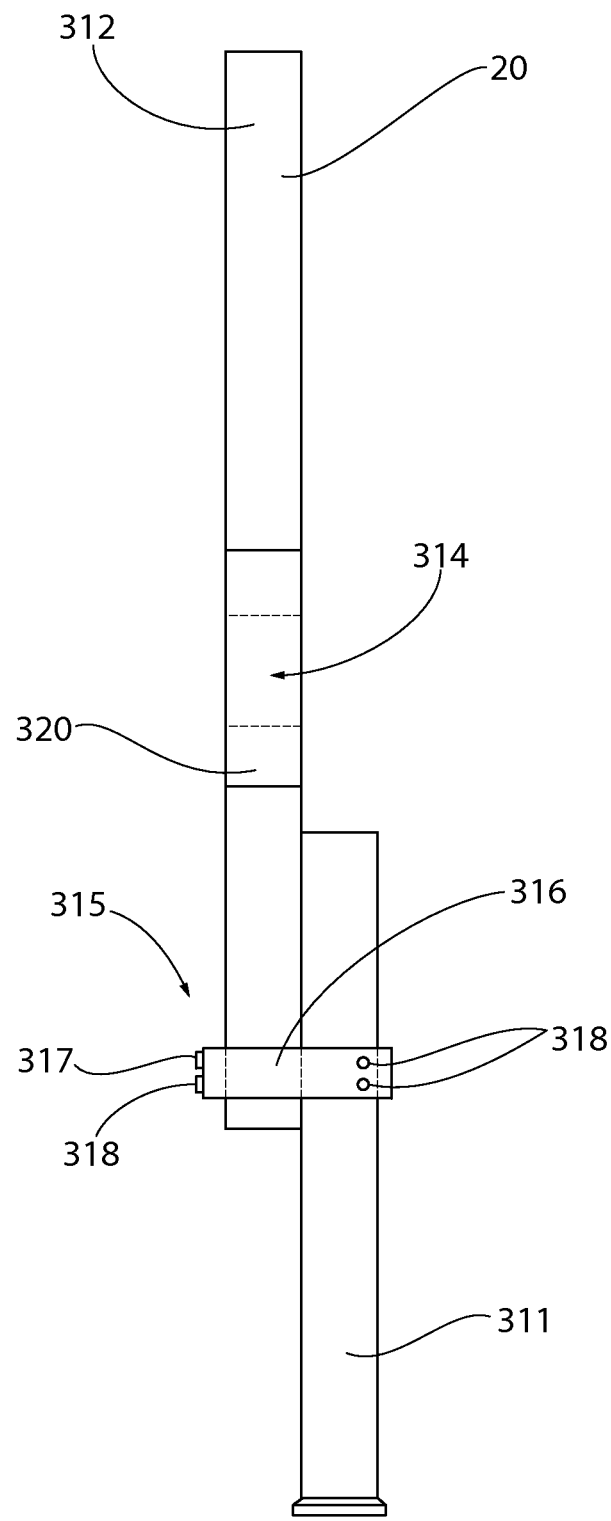
FIG. 8 depicts a front view of a vertically-extending upright member of FIG. 7.

With reference to FIGS. 7 and 8, a lavatory carrier 310 incorporating a waste line sleeve 320 is shown in accordance with another embodiment of the present invention. The lavatory carrier 310 fits within a 3½" wide chase space 100 and includes at least two vertically-extending upright members 20, attachment brackets 50, and support arms 60 for supporting a lavatory 70, as discussed above with respect to FIG. 1 and the '520 patent. The lavatory carrier 310 may or may not also include a top cross bar 30 and a bottom cross bar 40 for connecting the uprights 20, as discussed in the '520 patent and as shown in FIG. 9. As discussed above with reference to the lavatory carrier 110 shown in FIG. 2, the lavatory carrier 310 may incorporate some structure for operatively connecting the vertically-extending upright members 20, such as the cross bars 30, 40, which together with the vertically-extending upright members 20 may form a carrier frame 111. The waste discharge of the lavatory 70 is connected to the horizontal waste line 90 by the waste trap line 80. The horizontal waste line 90 may be pitched, as would be appreciated by one having ordinary skill in the art.

The waste line sleeve 320 is formed integral with at least one of the at least two vertically-extending upright members 20 of the lavatory carrier 310. Elongated openings 313 are formed in the sides of the vertically-extending upright member 20 to define a horizontal passageway 314 extending through the vertically-extending upright member 20, which is configured to receive the horizontal waste line 90 and allow the horizontal waste line 90 to extend through the waste line sleeve 320 and the vertically-extending upright member 20. It is to be appreciated, therefore, that according to the embodiment of FIGS. 7 and 8, the waste line sleeve 320 is formed as an integral portion of the vertically-extending upright member 20 surrounding the horizontal passageway 314. It is also to be appreciated that the waste line sleeve 320 may be structured or configured differently from the rest of the vertically-extending upright member 20. For instance, the waste line sleeve 320 may be formed with a greater material thickness, a stronger material, or may be structurally strengthened according to other known techniques to structurally reinforce the vertically-extending upright member 20 in the area surrounding the horizontal passageway 314.

As shown in FIGS. 7 and 8, the at least one of the at least two vertically-extending upright members 20 including the waste line sleeve 320 includes a fixed lower upright post segment 311 that is fixed to a bottom of the chase space 100 and an adjustable upper upright post segment 312. The adjustable upper upright post segment 312 includes the waste line sleeve 320 defined therein and is adjustably connected to the fixed lower upright post segment 311 by an adjustable connector assembly 315. The adjustable connector assembly 315 may include a bracket 316 fixedly connected to the fixed lower upright post segment 311 by fasteners 318, such as bolts or rivets, or by welding. The adjustable upper upright post segment 312 is slidably received in the bracket 316 and a pair of set screws 317 are received in the bracket 316 to engage the adjustable upper upright post segment 312 by clamping or by holes formed in the upper adjustable upright post segment 312 on site by the contractor or formed as part of a series of adjustment holes formed pre-drilled by the manufacturer. Alternatively, the bracket 316 could be fixedly connected to the adjustable upper upright post segment 312 to slidably receive the fixed lower upright post segment 311. It is to be appreciated that the adjustable connector assembly is exemplary only and may be of any form known to be suitable by those having ordinary skill in the art. For instance, the adjustable connector assembly could be a telescoping arrangement between the fixed lower upright post segment 311 and the adjustable upper upright post segment 312, wherein one of the fixed lower upright post segment 311 and the adjustable upper upright post segment 312 includes spring-loaded adjustment pins and is slidably received in the other, which includes adjustment holes to be engaged by the adjustment pins.

With reference to FIG. 9, a schematic depiction of a bank of vertical carriers, in accordance with any one of the above-mentioned embodiments, arranged in a common chase space 100 is shown in accordance with another embodiment of the present invention. Horizontal passageways 350 defined in the waste line sleeves of the multiple vertically-extending upright members 20 in the bank of vertical carriers are aligned with respect to each other such that the horizontal waste line 90 may be extended through the bank of vertical carriers at an angle A with respect to a horizontal axis of the bank. The angle A is set so that waste water from the lavatories will flow towards a connection between the horizontal waste line 90 and the main water waste line of the building and may be of any value known to be suitable to those having ordinary skill in the art. As discussed above, the waste line sleeves may further include alignment markings for aligning the waste line sleeves relative to each other within the bank of vertical carriers.

With reference to FIGS. 2-9, according to another embodiment of the present invention, a method of extending a horizontal waste line 90 through a vertical carrier 110, 210, 310 for a wall-hung lavatory 70 is provided. The method includes the steps of providing at least two vertically-extending upright members 20; providing at least one waste line sleeve 120, 150, 220, 320 connected to at least one of the at least two vertically-extending upright members 20, the at least one waste line sleeve 120, 150, 220, 320 including a horizontal passageway 128, 158, 228, 314 defined therein extends through the at least one of the at least two vertically-extending upright members 20; and passing the horizontal waste line 90 through the at least one waste line sleeve 120, 150, 220, 320 and the at least one of the at least two vertically-extending upright members 20.

With reference to FIGS. 2-4E, the step of providing the at least one waste line sleeve 120, 150 may further include the steps of determining a height the horizontal waste line 90 will pass through the at least one of the at least two vertically-extending upright members 20; cutting the at least one of the at least two vertically-extending upright members 20 into a bottom piece 21 and a top piece 22; inserting the waste line sleeve 120, 150 between the bottom piece 21 and the top piece 22 of the at least one of the at least two vertically-extending upright members 20 such that the horizontal passageway 128, 158 extends through the at least one of the at least two vertically-extending upright members 20 between the top piece 22 and the bottom piece 21; and connecting the waste line sleeve 120, 150 to the bottom piece 21 and the top piece 22.

With reference to FIGS. 5-6C, the step of providing the at least one waste line sleeve 220 may alternatively include the steps of determining a height the horizontal waste line 90 will pass through the at least one of the at least two vertically-extending upright members 20; sliding the waste line sleeve 220 along the at least one of the at least two vertically-extending upright members 20 to a position such that the horizontal passageway 228 is positioned at the height; connecting the waste line sleeve 220 to the at least one of the at least two vertically-extending upright members 20 at the position; and cutting a hole in each side of the at least one of the at least two vertically-extending upright members 20 such that the horizontal passageway 228 extends through the at least one of the at least two vertically-extending upright members 20.

With reference to FIGS. 7 and 8, the at least one of the at least two vertically-extending upright members 20 may include the fixed lower upright post segment 311 fixed to the bottom of the chase space 100 and the adjustable upper upright post segment 312. The waste line sleeve 320 may be formed integrally with the adjustable upper upright post segment 312. The method may further include the steps of determining a height the horizontal waste line 90 will pass through the at least one of the at least two vertically-extending upright members 20; and adjustably connecting the adjustable upper upright post segment 312 to the fixed lower upright post segment 311 with the adjustable connector assembly 315 such that the horizontal passageway 314 is positioned at the height.

With reference to FIG. 9, the method may further include the steps of arranging the vertical carrier 110, 210, 310 in a bank of vertical carriers in a common chase space 100; aligning the horizontal passageway 128, 158, 228, 314, 350 in the waste line sleeve 120, 150, 220, 320 with respect to other horizontal passageways 128, 158, 228, 314, 350 defined in other waste line sleeves 120, 150, 220, 320 of other vertical carriers along an angle A with respect to a horizontal axis; and passing the horizontal waste line 90 through the waste line sleeves 120, 150, 220, 320 such that the horizontal waste line 90 extends at the angle A with respect to the horizontal axis.

Figure 10:
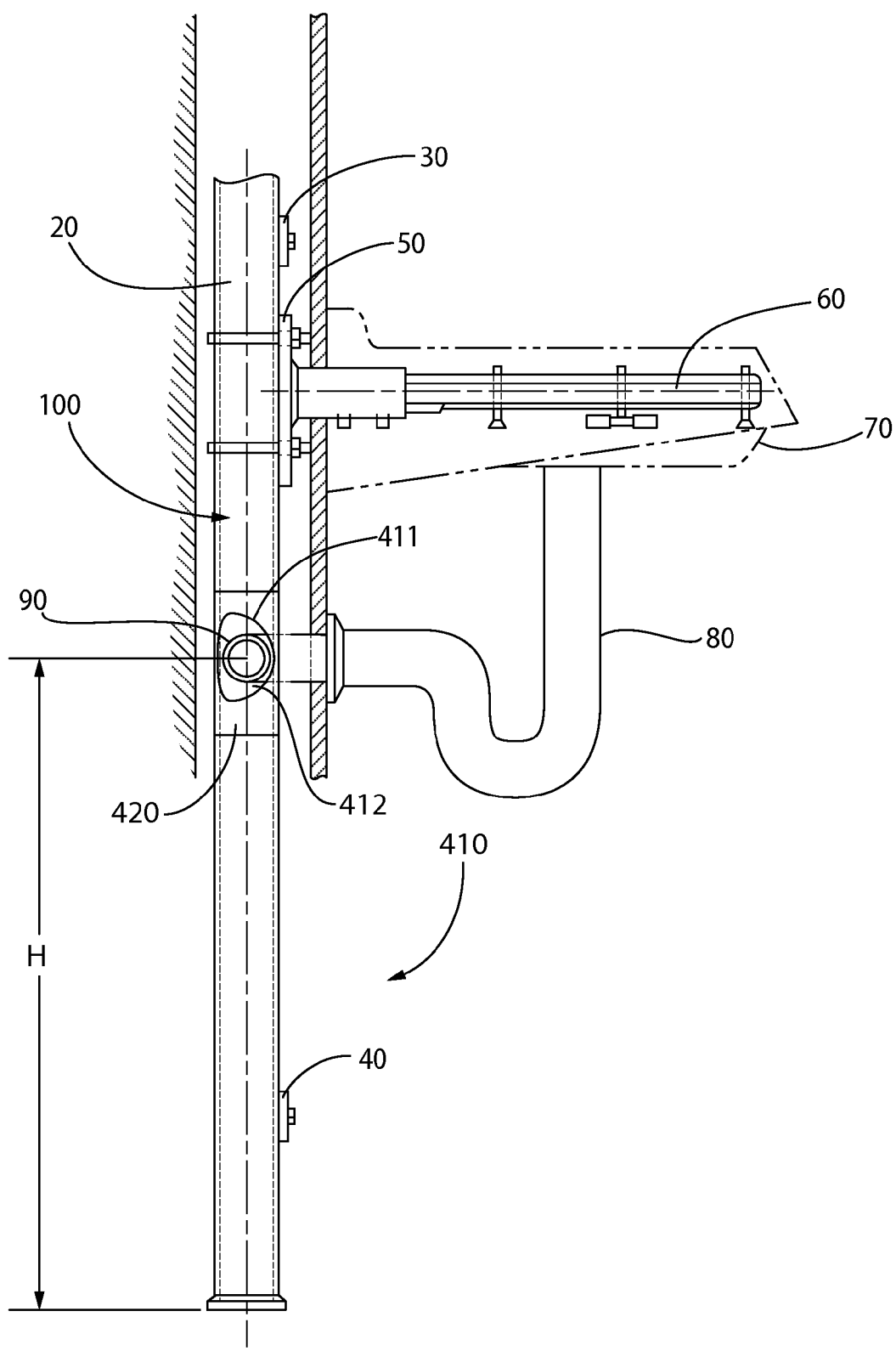
FIG. 10 depicts a left side view of a lavatory carrier incorporating a waste line sleeve according to another embodiment of the present invention.

With reference to FIG. 10, a lavatory carrier 410 incorporating a waste line sleeve 420 is shown in accordance with another embodiment of the present invention. The lavatory carrier 410 fits within a 3½" wide chase space 100 and includes at least two vertically-extending upright members 20, attachment brackets 50, and support arms 60 for supporting a lavatory 70, as discussed above with respect to FIG. 1 and the '520 patent. The lavatory carrier 410 may or may not also include a top cross bar 30 and a bottom cross bar 40 for connecting the uprights 20, as discussed in the '520 patent and as shown in FIG. 9. As discussed above with reference to the lavatory carrier 110 shown in FIG. 2, the lavatory carrier 410 may incorporate some structure for operatively connecting the vertically-extending upright members 20, such as the cross bars 30, 40, which together with the vertically-extending upright members 20 may form a carrier frame 111. The waste discharge of the lavatory 70 is connected to the horizontal waste line 90 by the waste trap line 80. The horizontal waste line 90 may be pitched, as would be appreciated by one having ordinary skill in the art.

The waste line sleeve 420 is formed integral with at least one of the at least two vertically-extending upright members 20 of the lavatory carrier 410. Elongated openings 411 are formed in the sides of the vertically-extending upright member 20 to define a horizontal passageway 412 extending through the vertically-extending upright member 20, which is configured to receive the horizontal waste line 90 and allow the horizontal waste line 90 to extend through the waste line sleeve 420 and the vertically-extending upright member 20. It is to be appreciated, therefore, that according to the embodiment of FIG. 10, the waste line sleeve 420 is formed as an integral portion of the vertically-extending upright member 20 surrounding the horizontal passageway 412. It is also to be appreciated that the waste line sleeve 420 may be structured or configured differently from the rest of the vertically-extending upright member 20. For instance, the waste line sleeve 420 may be formed with a greater material thickness, a stronger material, or may be structurally strengthened according to other known techniques to structurally reinforce the vertically-extending upright member in the area surrounding the horizontal passageway 412.

According to the embodiment shown in FIG. 10, therefore, the at least one of the at least two vertically-extending upright members 20 incorporating the waste line sleeve 420 has a unitary construction with a height H of the openings 411, and, therefore, the horizontal passageway 412, set during manufacture of the vertically-extending upright member 20. Accordingly, an embodiment of the present invention includes a method for providing a unitary vertically-extending upright member 20 having an integral waste line sleeve 420 with a horizontal passageway 412 defined therein. Essentially, the vertically-extending upright member 20 can be custom-ordered and manufactured, reducing the need for excess inventory. The method includes the steps of 1) taking measurements to determine the desired placement height of the horizontal waste line 90; 2) ordering one or more vertically-extending upright members 20 wherein the height H of the horizontal passageway 412 extending through the waste line sleeve 420 of the one or more vertically-extending upright members 20 is set according to the measurements obtained in step 1); 3) manufacturing the one or more vertically-extending upright members 20 according to the order received in step 2); and 4) installing the one or more vertically extending members 20 in the chase space 100 and extending the horizontal waste line 90 through the lavatory carrier(s) 410.

A method of extending a horizontal waste line 90 through a lavatory carrier 410 for a wall-hung lavatory 70, according to another embodiment of the present invention, includes the steps of determining a desired placement height H of the horizontal waste line 90 within a chase space 100 to be occupied by the lavatory carrier 410; receiving an order for at least one vertically-extending upright member 20 of the lavatory carrier 410, the at least one vertically-extending upright member 20 having a waste line sleeve 420 integrally formed therein, the waste line sleeve 420 including a horizontal passageway 412 defined therein that extends through the at least one vertically-extending upright member 20 at the desired placement height H; manufacturing the at least one vertically-extending upright member 20 according to the order received in the receiving step; delivering the at least one vertically-extending upright member 20 to its needed location; installing the at least one vertically-extending upright member 20 in the chase space 100; and passing the horizontal waste line 90 through the horizontal passageway 412 of the waste line sleeve 420 of the at least one vertically-extending upright member 20.

Also, with reference to FIGS. 9 and 10, the lavatory carrier 410 may be arranged in a bank of lavatory carriers in the chase space 100. The determining step may, therefore, include determining an angle A with respect to a horizontal axis at which the horizontal waste line 90 will extend through the chase space 100. The receiving step may include receiving an order for at least three vertically-extending upright members 20, each having a waste line sleeve 420 integrally formed therein, the waste line sleeve 420 including a horizontal passageway 412 defined therein that extends through the vertically-extending upright member 20 at the desired placement height H. The horizontal passageways 412 in the waste line sleeves 420 of the at least three vertically-extending upright members 20 are aligned with respect to each other along the angle A with respect to the horizontal axis. The passing step may include passing the horizontal waste line 90 through the waste line sleeves 420 such that the horizontal waste line 90 extends at the angle A with respect to the horizontal axis.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention, which is to be given the full breadth of the appended claims and any and all equivalents thereof.

The invention claimed is:

1. A vertical carrier for a wall-hung lavatory, comprising:
at least two vertically-extending upright members; and
at least one waste line sleeve connected to at least one of the at least two vertically-extending upright members,
wherein the at least one waste line sleeve includes a horizontal passageway defined therein, the horizontal passageway being configured to allow a horizontal waste line to extend through the at least one waste line sleeve and the at least one of the at least two vertically-extending upright members,
wherein the at least one waste line sleeve also includes a vertical passageway defined therein, the vertical passageway being configured to receive the at least one of the at least two vertically-extending upright members,
wherein the waste line sleeve includes a body having a right side wall, a left side wall, a front side wall, and a rear side wall defining a hollow interior that forms the vertical passageway extending through the body,
wherein the horizontal passageway is at least partially defined by openings in the right side wall and the left side wall of the body,
wherein the horizontal passageway and the vertical passageway intersect within the hollow interior of the body of the waste line sleeve, and
wherein the at least one of the at least two vertically-extending upright members comprises a top piece and a bottom piece, and the waste line sleeve is connected to the at least one of the at least two vertically-extending upright members between the top piece and the bottom piece.

2. The vertical carrier according to claim 1, wherein the at least two vertically-extending upright members are operatively connected.

3. The vertical carrier according to claim 1, further comprising a carrier frame, the carrier frame including the at least two vertically-extending upright members, a top cross bar, and a bottom cross bar.

4. The vertical carrier according to claim 1, the vertical carrier further comprising:
at least one support arm configured to support a lavatory on the vertical carrier; and
at least one bracket that connects the at least one support arm to the at least one of the at least two vertically-extending upright members.

5. The vertical carrier according to claim 1, wherein the body is made from cast iron or steel.

6. The vertical carrier according to claim 1, wherein the right side wall and the left side wall of the waste line sleeve each define flanges extending beyond the front side wall and the rear side wall of the waste line sleeve.

7. The vertical carrier according to claim 1, wherein the waste line sleeve structurally reinforces the at least one of the at least two vertically-extending upright members.

8. The vertical carrier according to claim 1, wherein the waste line sleeve is connected to the at least one of the at least two vertically-extending upright members by fasteners.

9. The vertical carrier according to claim 1, wherein the vertical carrier is configured to fit within a chase space having a width of 3½ inches.

10. A vertical carrier for a wall-hung lavatory, comprising:
at least two vertically-extending upright members; and
at least one waste line sleeve connected to at least one of the at least two vertically-extending upright members,
wherein the at least one waste line sleeve includes a horizontal passageway defined therein, the horizontal passageway being configured to allow a horizontal waste line to extend through the at least one waste line sleeve and the at least one of the at least two vertically-extending upright members,
wherein the at least one waste line sleeve includes a body having a right side, a left side, a front side, and a rear side defining a hollow interior that forms a vertical passageway extending through the body,
wherein the at least one of the at least two vertically-extending upright members comprises a top piece and a bottom piece, and the at least one waste line sleeve is connected to the at least one of the at least two vertically-extending upright members between the top piece and the bottom piece, and
wherein the waste line sleeve includes interior abutments extending from the front side and the rear side into the vertical passageway above and below the horizontal passageway, the interior abutments being configured to engage the top piece and the bottom piece of the at least one of the at least two vertically-extending upright members to prevent movement of the waste line sleeve with respect to the top piece and the bottom piece of the at least one of the at least two vertically-extending upright members.

11. A vertical carrier for a wall-hung lavatory, comprising:
at least two vertically-extending upright members; and
at least one waste line sleeve connected to at least one of the at least two vertically-extending upright members,
wherein the at least one waste line sleeve includes a horizontal passageway defined therein, the horizontal passageway being configured to allow a horizontal waste line to extend through the at least one waste line sleeve and the at least one of the at least two vertically-extending upright members,
wherein the at least one waste line sleeve includes a body having a right side wall, a left side wall, a front side wall, and a rear side wall defining a hollow interior that forms a vertical passageway extending through the body, and
wherein an elongated opening is defined in each of the right side wall and the left side wall of the body of the waste line sleeve, the elongated openings communicating the hollow interior of the body with an exterior of the right side wall and the left side wall of the body to define the horizontal passageway, and
wherein the front side wall and the rear side wall of the waste line sleeve each include a protruding central portion that conforms to the shape of the elongated openings.

12. The vertical carrier according to claim 10, wherein the at least one waste line sleeve structurally reinforces the at least one of the at least two vertically-extending upright members.

13. A vertical carrier for a wall-hung lavatory, comprising:
at least two vertically-extending upright members; and
at least one waste line sleeve connected to at least one of the at least two vertically-extending upright members,
wherein the at least one waste line sleeve includes a horizontal passageway defined therein, the horizontal passageway being configured to allow a horizontal waste line to extend through the at least one waste line sleeve and the at least one of the at least two vertically-extending upright members,
wherein the at least one waste line sleeve also includes a vertical passageway defined therein, the vertical passageway being configured to receive the at least one of the at least two vertically-extending upright members,
wherein the waste line sleeve includes a body having a right side wall, a left side wall, a front side wall, and a rear side wall defining a hollow interior that forms the vertical passageway extending through the body,
wherein the horizontal passageway is at least partially defined by openings in the right side wall and the left side wall of the body,
wherein the horizontal passageway and the vertical passageway intersect within the hollow interior of the body of the waste line sleeve, and
wherein the vertical carrier is arranged in a bank of vertical carriers in a common chase space and the horizontal passageway defined in the at least one waste line sleeve is aligned with respect to other horizontal passageways defined in other waste line sleeves of other vertical carriers such that a horizontal waste line may be extended through the bank of vertical carriers at an angle with respect to a horizontal axis.

14. The vertical carrier according to claim 13, wherein the at least one waste line sleeve includes alignment markings for aligning the at least one waste line sleeve relative to the other waste line sleeves in the bank of vertical carriers.

* * * * *